UNITED STATES PATENT OFFICE.

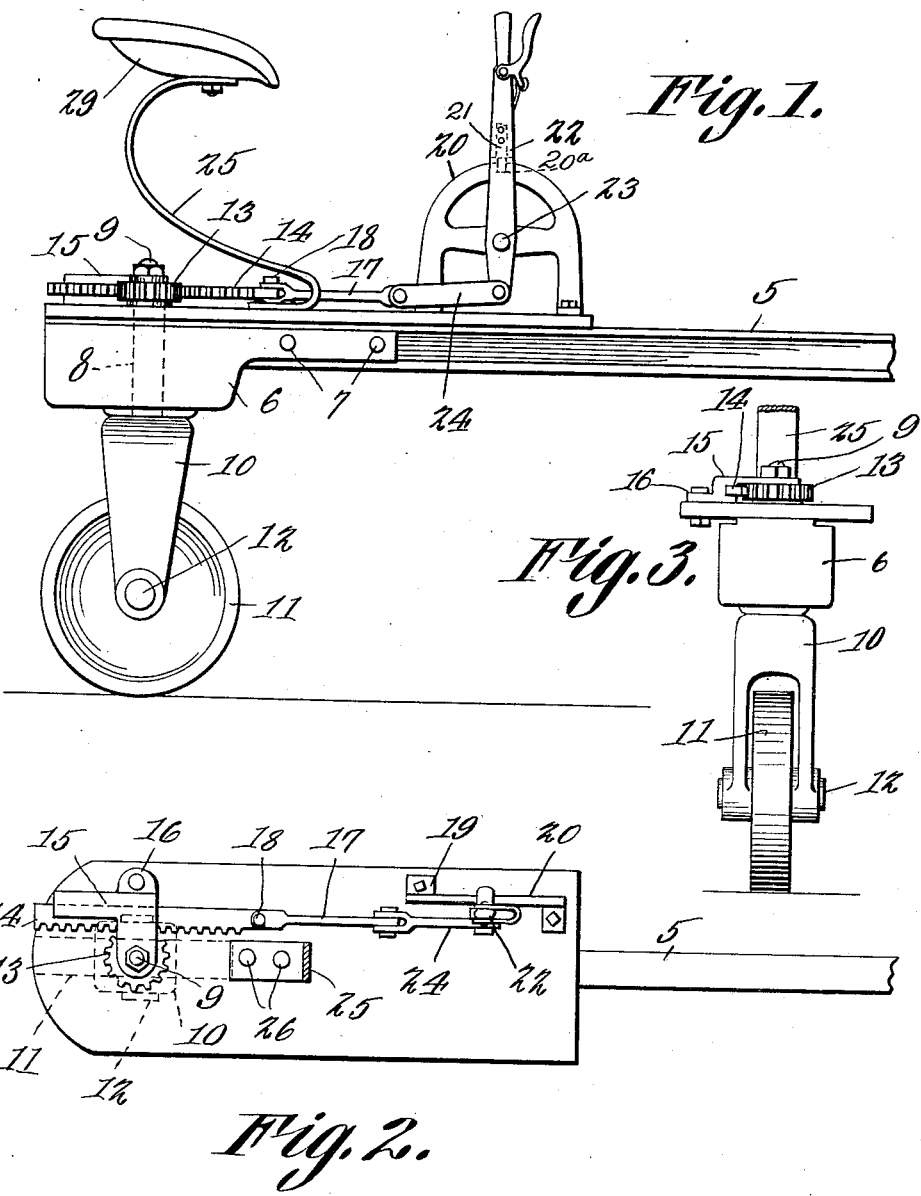

DANIEL HOUGENDOUGLER, OF HARRISONVILLE, MISSOURI, ASSIGNOR OF ONE-HALF TO PRICE T. BYRAM, OF HARRISONVILLE, MISSOURI.

STEERING DEVICE FOR HARVESTING-MACHINES.

1,279,870.    Specification of Letters Patent.    Patented Sept. 24, 1918.

Application filed July 19, 1917. Serial No. 181,563.

*To all whom it may concern:*

Be it known that I, DANIEL HOUGENDOUGLER, a citizen of the United States of America, and resident of Harrisonville, in the county of Cass and State of Missouri, have invented certain new and useful Improvements in Steering Devices for Harvesting-Machines, of which the following is a specification.

This invention relates to steering attachments for harvesters and particularly to headers or reapers, the said invention having for its object the provision of novel means whereby the driver or operator may be seated in convenient position to manipulate parts which will control the direction of travel of the machine, means being also provided whereby the power necessary to change the course of travel or to hold it on a certain course is minimized as compared with steering or guiding mechanism now commonly employed in machines of this character.

A further object of this invention is to provide means which can be readily applied to most machines of this character now in common use without materially changing the construction.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a fragment of a frame of a machine showing the steering mechanism applied thereto;

Fig. 2 illustrates a top plan view of the parts shown in Fig. 1 with the seat omitted; and Fig. 3 illustrates an end view of the parts shown in Fig. 2.

In these drawings 5 denotes a fragment of a frame of a harvesting machine, the end of which is provided with a bracket 6 secured to the sides of the frame by fastenings such as 7, the said bracket having an aperture 8 extending therethrough and forming a journal bearing for a shank or shaft 9 which carries a forked frame 10 between sections of which a colter or guiding wheel 11 may rotate, the said wheel 11 being mounted on a spindle 12 supported by the frame. The shaft 9 has a pinion 13 mounted on it, which is engaged by a rack 14 slidable longitudinally of the frame. A guide plate 15 partially embraces the rack and holds it in engagement with the pinion, the said plate having an aperture to receive the shaft 9 and being secured to the bracket by the fastening 16. The guide plate 15 serves to retain the rack in operative relation to the pinion, as stated, and the inner end of the rack has a link 17 connected to it through the medium of the pivot 18.

A stand or bracket 19 supports a segment 20 and in connection with it a dog 21 may operate, the said dog 21 being pivoted on the operating lever 22 so that it may engage the segment by entering a recess 20ª and hold the operating lever 22 in its adjusted position. The lever may oscillate on a pivot 23 carried by the bracket 19 and the lower end of the lever is connected to the link 17 by a link 24, thus making it possible for an operator to oscillate the handle and reciprocate the rack bar.

A spring seat support 25 is attached to the bracket 6 by the fastenings 26 and the seat 29 is supported by the said spring, the location of the said seat being in such relation to the oscillating lever as to permit an operator occupying the said seat to manipulate the lever as stated.

I claim:

In a steering device for harvesting machines, a frame, a bracket carried by the frame having an aperture therein, a spindle rotatable in the aperture, a guiding wheel on one end of the spindle, a gear wheel on the other end, a housing on the plate forming a bearing for the spindle, a rack bar slidable within the housing and engaging the said gear wheel to rotate the same, a lever, means for oscillatably mounting the same, an extension pivoted to the lever, and a link connecting the said extension and rack bar, whereby as the lever is operated the guiding wheel is turned.

DANIEL HOUGENDOUGLER.

Copies of this patent may be obtained for five cents each, by addressing the "Commissioner of Patents, Washington, D. C."